(12) United States Patent
Ananthapur Bache et al.

(10) Patent No.: US 10,691,429 B2
(45) Date of Patent: Jun. 23, 2020

(54) CONVERTING WHITEBOARD IMAGES TO PERSONALIZED WIREFRAMES

(71) Applicant: INTERNATIONAL BUSINESS MACHINES CORPORATION, Armonk, NY (US)

(72) Inventors: Vijay Kumar Ananthapur Bache, Bangalore (IN); Jhilam Bera, Bangalore (IN); Vijay Ekambaram, Chennai (IN); Saravanan Sadacharam, Chennai (IN)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 15/646,597

(22) Filed: Jul. 11, 2017

(65) Prior Publication Data
US 2019/0018660 A1    Jan. 17, 2019

(51) Int. Cl.
*G06F 8/38* (2018.01)
*G06K 9/00* (2006.01)
*G06F 8/34* (2018.01)

(52) U.S. Cl.
CPC ............. *G06F 8/38* (2013.01); *G06F 8/34* (2013.01); *G06K 9/00422* (2013.01)

(58) Field of Classification Search
CPC .......... G06F 8/38; G06F 8/34; G06K 9/00422
See application file for complete search history.

(56) References Cited

U.S. PATENT DOCUMENTS

| 6,476,834 B1 * | 11/2002 | Doval ................. G06F 9/451 715/863 |
| 6,526,526 B1 | 2/2003 | Dong et al. |
| 8,869,049 B1 * | 10/2014 | Li ........................ G06F 3/00 715/705 |
| 2005/0254775 A1 | 11/2005 | Hamilton et al. |
| 2014/0032770 A1 | 1/2014 | Pegg |

(Continued)

FOREIGN PATENT DOCUMENTS

| EP | 1914634 | 4/2008 |
| WO | 2011054024 | 5/2011 |

(Continued)

OTHER PUBLICATIONS

Erhan, Dumitru et al.; Scalable Object Detection using Deep Neural Networks; 2014 IEEE Conference on Computer Vision and Pattern Recognition; Jun. 23-28, 2014; pp. 2155-2162.

(Continued)

*Primary Examiner* — William L Bashore
*Assistant Examiner* — Daniel W Parcher
(74) *Attorney, Agent, or Firm* — Schmeiser, Olsen & Watts; Mark C. Vallone

(57) ABSTRACT

A method for creating a wireframe model for a user interface. A computer identifies an image on a user interface. The computer performs image recognition to identify objects and text within the image. The computer creates a digital widget model based on the step of performing image recognition. The computer delivers digital widget output to a user experience designer for editing, wherein the digital widget output is based on the step of creating. The computer stores edits made by the user experience designer in a historical records database and the wireframe model design is finalized.

16 Claims, 9 Drawing Sheets

(56) References Cited

U.S. PATENT DOCUMENTS

| | | | |
|---|---|---|---|
| 2015/0279070 A1 | 10/2015 | Nandakumar et al. | |
| 2015/0310122 A1* | 10/2015 | Hall | G06F 17/212 |
| | | | 715/234 |
| 2015/0332037 A1 | 11/2015 | Tse et al. | |
| 2016/0034441 A1* | 2/2016 | Nguyen | G06F 17/2765 |
| | | | 715/234 |
| 2016/0266878 A1* | 9/2016 | Mankovskii | G06F 8/38 |
| 2017/0131867 A1 | 5/2017 | Anbil Parthipan et al. | |
| 2018/0203571 A1* | 7/2018 | Dayanandan | G06T 7/73 |

FOREIGN PATENT DOCUMENTS

| | | |
|---|---|---|
| WO | 2012116304 | 8/2012 |
| WO | 2015095343 | 6/2015 |

OTHER PUBLICATIONS

Weiss, Sholom M. et al.; Rule-based Machine Learning Methods for Functional Prediction; Journal of Artificial Intelligence Research 2; Dec. 1995; pp. 383-403.

Szegedy, Christian et al.; Deep Neural Networks for Object Detection; Advances in Neural Information Processing Systems 26; Dec. 5-10, 2013; 9 pages.

Neo Insight Newsletter; The Insighter Sep. 2008; URL: http://ww.neoinsight.com/newsletter/0809.html; retrieved from the Internet Feb. 4, 2017; 5 pages.

Wang, Xiaogang; Deep Learning in Object Detection, Segmentation and Recognition; Department of Electronic Engineering, The Chinese University of Hong Kong; URL: http://www.ee.cuhk.edu.hk/~xgwang/; retrieved from the Internet Feb. 4, 2017; 64 pages.

Microsoft Community; Convert an Excel document into an interactive web form; URL: https://answers.microsoft.com/en-us/msoffice/forum/msoffice/excel-ms . . . ; retrieved from the Internet Feb. 4, 2017; 2 pages.

Khan, Jameel; 22 Good Prototype and Wireframe Tools for Mobile and Web Design; URL: http://www.onestrapixel.com/2013/03/01/22-good-prototype-and-wirefr . . . ; retrieved from the Internet Feb. 4, 2017; 13 pages.

Convert a PSD to Android XML UI and Java; url: http://exportkit.com/learn/how-to/export-your-psd/convert-a-psd-android-xml-us-and-java; retrieved from the Internet Feb. 4, 2017; 16 pages.

Mironov, Anatoly; Publishing Visio diagrams as html image maps; CHUVASH.EU; URL: https://chuvash.eu/2015/05/25/publishing-visio-diagrams-as-html-image-maps; retrieved from the Internet Feb. 4, 2017; 6 pages.

Spreadsheet Converter; Create web forms with Excel; URL: http://wp2.spreadsheetcoverter.com/create-your-web-calculator-or-web-form-with-excel; retrieved from the Internet on Feb. 4, 2017; 7 pages.

* cited by examiner

CONVERTING WHITEBOARD IMAGES TO PERSONALIZED WIREFRAMES

TECHNICAL FIELD

The subject disclosure generally relates to creating wireframes for user interface applications by modeling the wireframe based on an original sketch.

BACKGROUND

As computing technology advances and computing devices become more prevalent, computer programming techniques have adapted for the wide variety of computing devices in use. For instance, program code can be generated according to various programming languages to control computing devices ranging in size and capability from relatively constrained devices such as simple embedded systems, mobile handsets, and the like, to large, high-performance computing entities such as data centers or server clusters.

Conventionally, as applications are being developed and/or modified for use with computing devices, a new user interface or website interface might be created without reference to an existing interface. However, it is more common to utilize a sketch or an existing interface and apply modifications to that sketch or interface. Therefore, a mockup or model representation is created and can be used to obtain feedback from others involved in the development process.

When analysts work on enhancements of an existing application, the analysts have to recreate the existing application screens manually in a mockup tool in order to be able to modify the screens as part of desired specifications. Creation of mockups is time consuming and often results in mockups that are not adequate for some purposes.

Consequently, the ability to quickly create mockups or model representations for existing applications and/or websites is desirable. Analysts also desire the ability to create a mockup of an existing user interface that has a consistent amount of granularity and the ability to have a mockup created in a digital and easily consumable format allowing the mockup to be easily shared and manipulated.

Conventionally, various solutions have been proposed for creating user interface mockups. However, none of the solutions proposed for creating mockups has addressed all of the above requirements and such a solution would be desirable to significantly improve efficiency of creating user interface mockups.

Often, UI/UX designing of application starts from simple whiteboarding. Converting the initial white boarding to a designed document and present to client is real time consuming work. Due to project requirements and changing designs, a designer needs to rework with existing document design. The iterative process is time consuming and waste a lots of time during the design phase of application.

Many projects have certain amount of common designs which can be repetitive work for designers. Identifying similar pattern from the basic whiteboard work and suggest to pick style from the available templates can reduce effort drastically.

The above-described deficiencies of today's computing system and mockup creation system techniques are merely intended to provide an overview of some of the problems associated with conventional systems, and are not intended to be exhaustive. Other problems with conventional systems and corresponding benefits of the various non-limiting embodiments described herein may become further apparent upon review of the following description.

SUMMARY

A method for creating a wireframe model for a user interface. A computer identifies an image on a user interface. The computer performs image recognition to identify objects and text within the image. The computer creates a digital widget model based on the step of performing image recognition. The computer delivers digital widget output to a user experience designer for editing, wherein the digital widget output is based on the step of creating. The computer stores edits made by the user experience designer in a historical records database and the wireframe model design is finalized.

The foregoing summary is provided herein to help enable a basic or general understanding of various aspects of exemplary, non-limiting embodiments that follow in the more detailed description and the accompanying drawings.

BRIEF DESCRIPTION OF THE DRAWINGS

Various non-limiting embodiments are further described with reference to the accompanying drawings in which.

DETAILED DESCRIPTION

Figure 1:
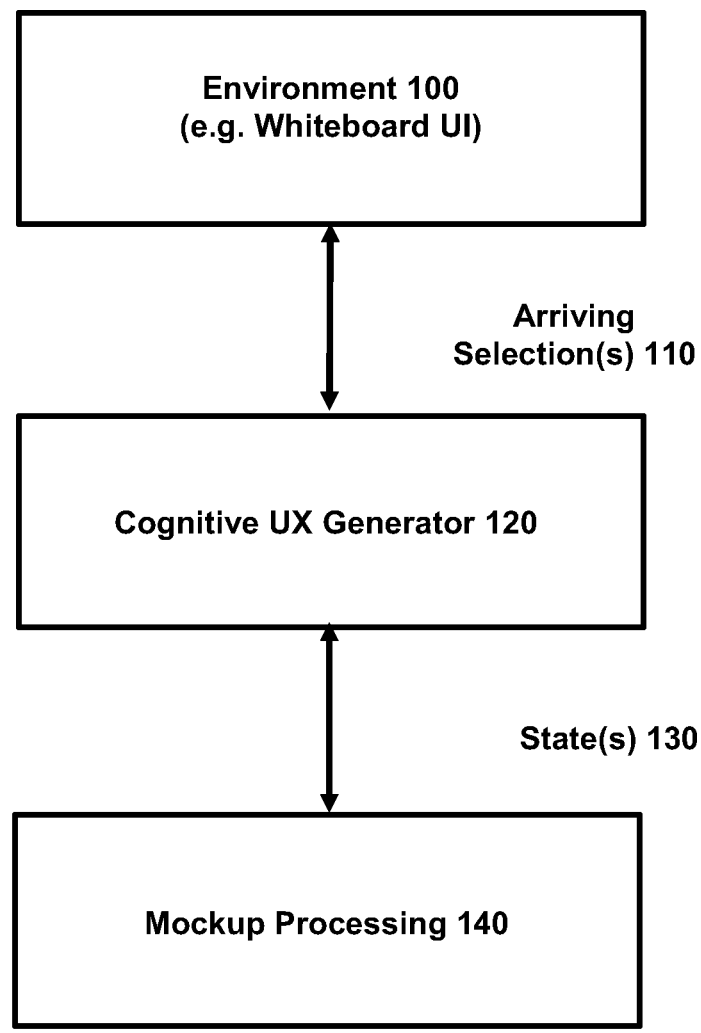
FIG. 1 is a block diagram showing a simplified mockup system in accordance with an embodiment of the present invention.

When a designer desires to change an application, website, and/or one or more interface windows associated with the application or website, mockups are created through storyboarding or wireframing. There are at considerations associated with successful mockup creation. The first consideration is simplicity of creating the mockup. For instance, allowing someone with little or no knowledge of mockup creation to create a useful mockup is beneficial. The second consideration is the speed of mockup creation in order for mockups to be valuable and useful tools. Therefore, mitigating the amount of time it takes to create the mockup so that the benefits outweigh the costs is beneficial. To this end, utilizing a traditional whiteboard for the mockup stage of development is often useful. However, handwritten text and objects drawn on a whiteboard cannot be easily converted to a useable form for wireframe creation.

Thus, the present invention permits creation of a mockup of a user interface with a limited number of selections (or clicks) or with a single selection. As disclosed herein, the mockup can be created by capturing shapes, such as through text and image recognition, from a whiteboard sketch and converting the shapes to a raw format that is editable. Thus, instead of capturing pixels by taking a screenshot, the concept of a tree, a button, text area or the concept of a check box can be captured. Further, the approximate size and coordinates of the elements and/or controls within the interface windows may be captured. Thus, the type of control, the state of the control, and/or layout information for the interface is obtained in order to capture a user interface efficiently. The type of control provides information related to the control and/or element (e.g., the control is a check box, the control is a text box, the element is an image, and so on). The layout information captured can be the positioning and the size of the element and/or control.

In one example, the system includes a converter component configured to convert the model representation into a format compatible with the target application. In one embodiment of the present invention, this converter component is called the cognitive UX generator. The cognitive UX generator is further configured to convey the model representation in the format compatible with the target application for use as a mockup.

Herein, an overview of some of the embodiments for user interface mockups from working software has been presented. As a roadmap for what follows next, various exemplary, non-limiting embodiments and features for user interface mockups are described in more detail. Then, some non-limiting implementations and examples are given for additional illustration, followed by representative network and computing environments in which such embodiments and/or features can be implemented.

In one embodiment, the method for converting a whiteboard image to a personalized wireframe follows the following steps. At the outset, the UX designer draws on the whiteboard a sketch including meta-data about the controls, while the hand-drawn image on the whiteboard includes features such as color, texture, etc., in a defined notation. The designer then takes a picture of the white board. The system will then use cognitive vision and image recognition to recognize the features, controls, and the meta-data that is defined for the controls. The system then uses the UX Standards documents, such as HMI, UI guidelines (e.g., industry best practice), to render the first draft of the user interface. The system also uses the past learning recorded in a historical database (e.g., past edits made by the UX designer on the suggested UIs). The final UI mockup is presented to the UX Designer and the UX designer is then allowed to make changes. The system learns from the edits made by the UX designer and will apply the past knowledge to the UI rendering. In this way, this way the system continuously learns and improves the UI rendering that the system generates. Over a period of time, the system generates a UI database which includes samples that are ready for production. Thus, the UX designer is, in effect, training the system, while reviewing and making changes to the UI output created by the system. More features and aspects of the invention will be described below.

FIG. 1 is a block diagram showing a simplified mockup system in accordance with an embodiment of the present invention. The computing system includes an environment 100, which can be a graphical user interface, a desktop application, a web-based application, or another programming platform. The exemplary embodiment presents a whiteboard as the graphic user interface but other environments may be utilized by the present invention. For example, the environment 100 can include a target application for which a model representation or mockup is to be created. For instance, a user can provide a gesture or other input (e.g., voice command, text command, and so forth) that indicates the target application is to be captured. The gesture can be provided as input in the form of one or more arriving selections 110. An cognitive UX generator 120 is configured to receive the one or more arriving selections 110 and capture a multitude of states (e.g., the window and all the subcomponents inside the window) of multiple user interface control hierarchies (e.g., one control hierarchy per window) of the target application. For example, a first window can launch a second window, which launches a subsequent window. In another example, a user, interacting with a first window, can navigate to a second window and, through interaction with the second window (or the first window) can navigate to a third window, and so forth.

Utilizing a whiteboard as the environment 100, the image created on the whiteboard may be captured and downloaded by known techniques for later processing. For example, the user may simply take a photo of the whiteboard image, or may utilize known techniques to download the whiteboard image for later processing. The whiteboard image will include the different sections such as a button section, a password section, a text area with different color codes as, for example, shown in FIG. 4.

The cognitive UX generator 120 conveys the multitude of states 130 to a mockup processing component 140 utilized by a UX designer and configured to generate a high fidelity wireframe model representation. For instance, the mockup processing component 140 can generate the model representation in a generic user interface model. The model representation can be output to the user in any perceivable format for generating mockups, code, and so forth. For instance, the model representation can be rendered on a user device in an editable and openly consumable format (e.g., the user and/or others can read the representation and consume the same). In an example, the model representation can be output in digital format. In an embodiment, the module representation is output at about the same time (e.g., in real-time) as the multitude of states are captured or at a different time (e.g., stored for later consumption). In some embodiments, the mockup processing component 140 is further configured to retain the model representation as an intermediate model for later use as a mockup or for other purposes. For example, the intermediate model is generic and, therefore, can be standardized and multiple applications, third parties, and so forth can consume the intermediate model.

The cognitive UX generator 120 is further configured to preform advanced text and image recognition to identify the objects on the whiteboard image including meta tags marked on the whiteboard based on known protocol. The cognitive UX generator 120 may utilize current HMO guidelines and historical wireframe samples to learn ways to generate wireframes based on a target platform, e.g., iOS® (an operating system used for mobile devices), Android® (an open-source operating system used for smartphones and tablet computers), etc.

In accordance with some embodiments, the cognitive UX generator 120 utilizes an accessibility application programming interface to capture the multitude of states. For example, the accessibility application programming interface can be a user interface automation, a Hypertext Markup Language Document Object Model (HTML DOM), or another type of accessibility application programming interface. In an embodiment, the cognitive UX generator 120, though identification of the application or window, may obtain a handle to the application or window. The obtained handle allows for the use of at least some of the historical wireframes and control libraries that are available and from which information from the running application can be extracted.

In an embodiment, the mockup system illustrated by FIG. 1 can differ in operation from a conventional mockup construction system in order to provide additional benefits over those achievable by computing systems that employ conventional mockup construction systems. For instance, the mockup system disclosed herein is able to quickly generate a starter storyboard or screen by simply recording a manipulation of an existing application. The storyboard is a potential output artifact although other means of outputting the mockup or model representation can also be utilized. The disclosed aspects have the benefit of mitigating an amount of screen authoring time from, for example, ten minutes (or more) per screen to, for example, less than about one minute per screen. Another benefit of the disclosed aspects is the ability to create the starter storyboard or screen in a simplified manner. A further benefit of the disclosed aspects is the utilization of control libraries for object recognition in order to extract information associated with the running application.

Figure 2:
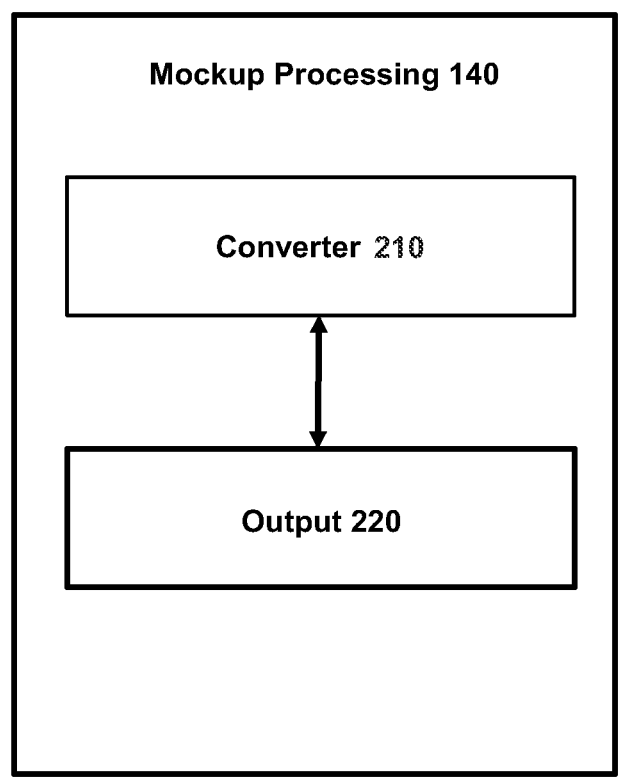
FIG. 2 is a block diagram showing a mockup processing component containing a converter component and an output component in accordance with an embodiment of the present invention.

FIG. 2 is a block diagram showing a mockup processing component containing a converter component and an output component in accordance with an embodiment of the present invention. In one embodiment, mockup processing component 200 is configured to serialize control hierarchy and associated information into the model representation. For example, the control hierarchy and association information can be serialized into a simple Extensible Markup Language (XML) representation.

After recording and capturing of the application is completed, the converter component 210 is configured to interpret the model representation and convert it into another concrete representation. For instance, the converter component 210 is configured to convert the model representation into a format compatible with one or more target applications. In an example, the target application can be a sketchy representation, XAML, HTML, and so forth. The output component 220 is configured to convey the model representation in a format compatible with the target application for use as a mockup or other target application model. In some embodiments, a shape, for example, is captured and converter component 210 converts the shape to a raw format that is editable. The editable raw format is presented to the user by output component 220. In an example, output component 220 can render the target application model as a modifiable and/or consumable mockup for an application.

In another non-limiting example, if the target application is a visual user interface builder, the converter component 210 can reformat the model representation and generate Extensible Application Markup Language (XAML) or another markup language. In a further non-limiting example, if the target application is a graphical application programming interface, converter component 210 can generate C# code or another type of code.

Figure 3A:
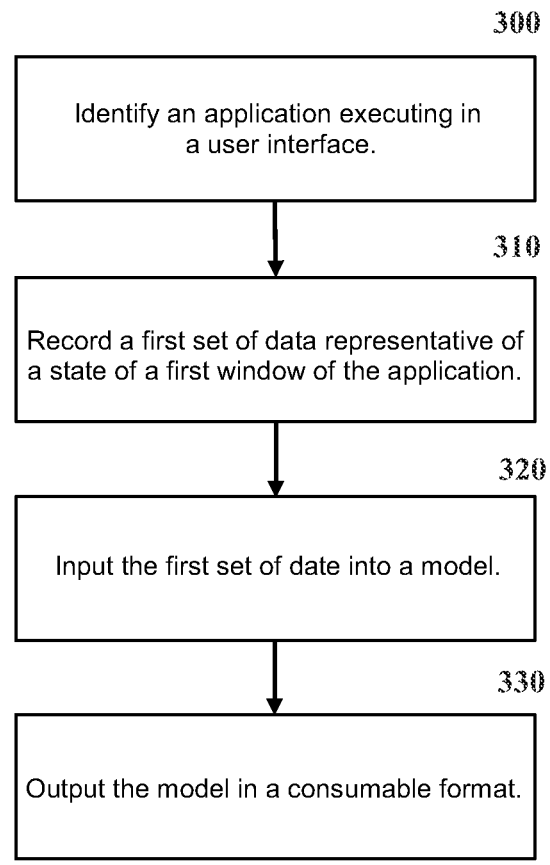
FIG. 3a is a flow diagram illustrating an exemplary non-liming process for creating a mockup of a user interface according to an embodiment of the present invention.

FIG. 3a is a flow diagram illustrating an exemplary non-liming process for creating a mockup of a user interface in accordance with an embodiment of the present invention. At 300, an application executing within the user interface of an application, a whiteboard, web site, and so forth is identified. The identification can be based on a received gesture or other indication that a mockup of the application is to be initiated. At 310, a first set of data representative of a state of a first window of the application is recorded. At 320, the first set of data is input into a model. If there are other sets of data gathered (e.g., a second set representing a flow, a third set representing a second window, and so forth), the other sets of data are combined with the first set of data for output as the representative model. At 330, the model is output as a mockup or other representation in a consumable format. At this stage, the model is output to the cognitive UX generator 120 for text and object recognition to identify the objects represented by the output of step 330.

Prior whiteboard applications have been used via computer systems, enabling displayed content to be drawn upon or otherwise manipulated via input devices such as mice, trackpads, touchscreens, etc. In this way, the whiteboard application can provide the functionality of a physical dry-erase or chalkboard in a computing context. Whiteboard applications are commonly used in collaborative settings such as meetings, brainstorming sessions, classrooms, etc. Therefore, in some instances a plurality of users may manipulate content presented via the whiteboard application in one or more sessions. The data associated with the manipulation of the content may be saved locally by the computing system.

A whiteboard application executed by a computing system including an interactive display device is described herein. The whiteboard application is configured to quickly and efficiently upload and download data to and from a cloud-based storage device during a whiteboard application user session. Specifically, data may be generated via the whiteboard application and subsequently sent to a cloud-based storage system when a user provides credentials to a user account in the cloud-based storage system. Additionally, previews of files stored in the cloud-based storage device can also be presented via the interactive display device in response to the user entering user credentials. As a result, a user can not only easily offload desired content to a cloud-based storage system but also quickly preview content stored in the cloud-based storage system, thereby enhancing the current whiteboard session. In this way, a user can quickly capture content and send the captured content to a cloud-based system for later use as well as preview previously captured content stored in the cloud-based system.

Figure 3B:
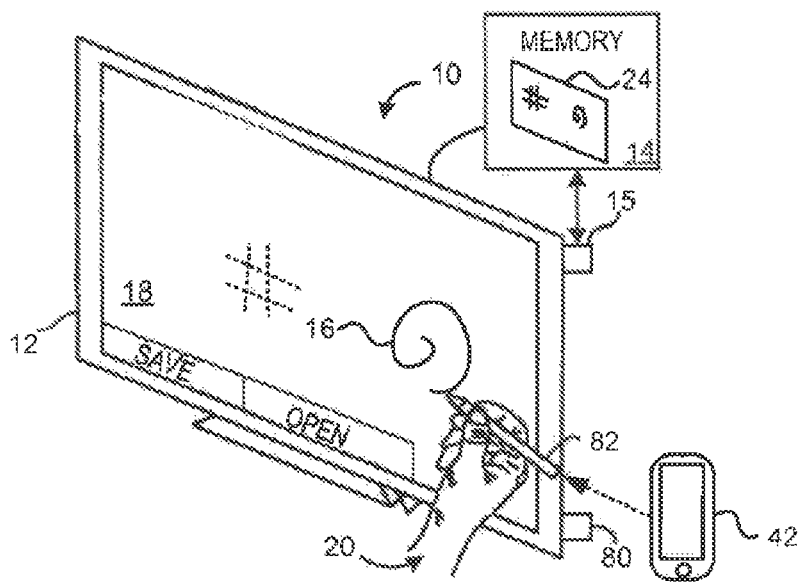
FIG. 3b depicts a computing system configured to store data from a whiteboard application executed on the computing system according to an embodiment of the present invention.

FIG. 3b depicts a computing system configured to store data from a whiteboard application executed on the computing system according to an embodiment of the present invention. The computing system 10 may be configured to include an interactive display device 12 (e.g., interactive touch sensitive display device) and a memory 14 including instructions executable by a processor 15. The whiteboard application 18 may be stored in memory 14 as instructions executable by the processor 15. The computing system 10 may be further configured to record, in the memory 14, a whiteboard file 24. The whiteboard file 24 may include whiteboard data 16 input into the whiteboard application 18 by a user 20 via the interactive display device 12.

The interactive display device 12 may include a sensing device 80. The sensing device may include one or more of a capacitive touch sensor, an optical touch sensor, etc. The interactive display device 12 may include a liquid crystal display (LCD), an organic light-emitting diode (OLED), active-matrix organic light-emitting diode (AMOLED), projection display, etc., for presenting graphics. The interactive display device 12 is configured to receive and process ink inputs and touch inputs. It will be appreciated that an ink input includes an interactive input with a stylus 82. The interactive display device 12 may further be configured to receive and process multi-touch inputs. Additionally, it will be appreciated that the aforementioned inputs may be sent to the memory 14 and processor 15 for processing via the whiteboard application 18. Input to the application 18 may also be accomplished by a mobile device 42 according to known techniques.

Figure 4:
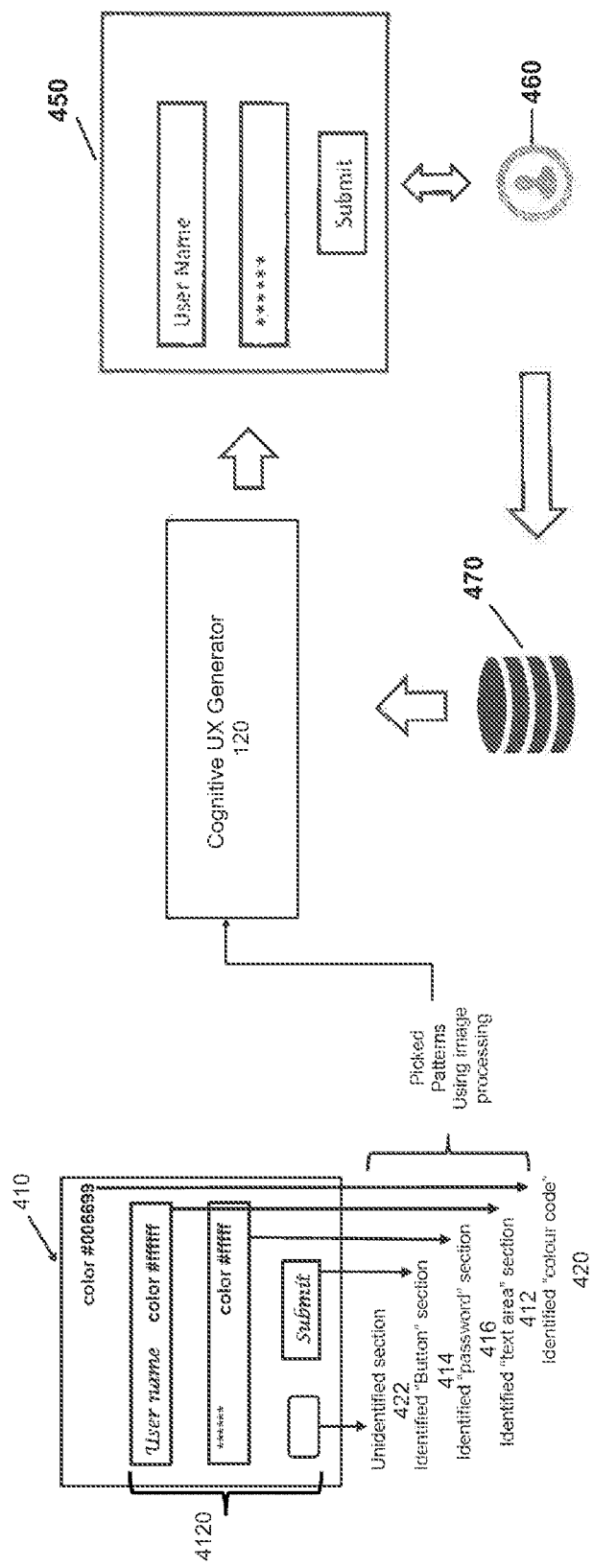
FIG. 4 is a schematic representation of the steps of the present invention illustrating the process of generating a whiteboard image then transferring the image to the cognitive UX generator and then to a suitable environment of editing by the UX/UI designer according to an embodiment of the present invention.

FIG. 4 is a schematic representation of the steps of the present invention illustrating the process of generating a whiteboard image then transferring the image to the cognitive UX generator and then to a suitable environment of editing by the UX/UI designer in accordance with an embodiment of the present invention. The first stage of the wireframe creation process according to the present invention includes the creation of an initial whiteboard sketch 410 while maintaining proper pattern for various text area 412, UI submit button section 414, password section 416, color code 420, unidentified section 422, etc. The system next captures the image 410 by taking picture of whiteboard work or by downloading the image as described above. The image is then uploaded to the platform of the cognitive UX generator 120. Object pattern recognition is performed by the cognitive UX generator 120 by using at least one pattern/feature detection algorithm.

Next, the system at the cognitive UX generator 120 performs a verification of UI guideline (for example, using known software such as HMI, appkit, etc.). For example, the system may work with the standard AppKit controls such as buttons, labels, text fields, check boxes, segment controls in an application and cause instant actions or visible results when a user manipulates the application.

By applying known HMI and UI guidelines, the system may replace guideline-rejected pattern object (if available in machine learning data) by available possible pattern objects stored in a library. If nearest pattern is not available then the system will push that pattern for a machine learning process. Next, the system will convert sketch image into template using identified patterns and store the template in the database for the further use.

Next, the template is analyzed by a UX reviewer 460 and the UX-reviewer changes are stored on the created templates and new rules are created. A user experience designer (UX designer) 460 is an individual who designs the entire interface, components and overall interaction of a user with a computing device or application. UX designers enable the creation of an information system that is simpler and more efficient for the human end user. A UX designer is sometimes also referred to as a UX consultant or information architect.

Thus, the present invention proposes cognitive UX generator 120 and a method and system for converting whiteboard drawings 410 to high fidelity UX personalized wireframes 450 adhering to HMI guidelines using the following steps: (1) identifying widgets 412-422 from whiteboard sketch 410: (2) create initial whiteboard sketch 4120 by maintaining proper pattern for text 412, UI button 414, table, view, color 420 etc.; (3) capture image by taking picture of or downloading the data of the whiteboard work 410 and upload the image data to the cognitive UX generator 120; (4) object pattern recognition by using pattern/feature detection algorithm; and (5) based on the detected objects, determine corresponding digital widgets which gets calibrated using the below steps:

The following describes the process for applying HMI guidelines to the wireframe creation process. The system will bootstrap the widget creation cognitive model with standard HMI guidelines because the UX-Developer/Designer bootstraps the standard HMI guidelines as basic rules for widget creation cognitive models, and based on the fed HMI guidelines, digital widgets gets calibrated to match to the guidelines.

Additionally, the system will track UX Designer/Reviewer edits and store the edits, changes and comments in the cognitive analysis database 470 for use by the cognitive generator. More specifically, the system will fine-tune the widget creation cognitive model based on UX-reviewer edits. The changes and edits made by the reviewer 460 are tracked and stored in a database 470 for later use by the cognitive UX generator 120. More specifically, prior widget output described above is provided as input to UX-reviewer and behavioral analytics is done on the UX-reviewer edits to identify the reviewer's comments and changes on the self-created widgets generated according to the foregoing processes.

In accordance with this invention, new rules are extracted based on the UX-reviewer chances in the context of the app-screen as stored in the database 470. These rules get added to the widget creation cognitive model as extra features. Thus overtime, the widget creation cognitive model learns all the possible patterns and rules which UX-reviewer 460 will prefer for various widgets and will output wireframe just the way as UX-reviewer could have designed it.

One unique feature of this invention the UX-personalized widget creation cognitive model which becomes personalized over time based on UX-reviewer edits and HMI-guideline-bootstrapping and which could output wireframes having high similarity of what the UX-Reviewer would have designed without redundant reviewer edits in future processing of similar templates.

Figure 5:
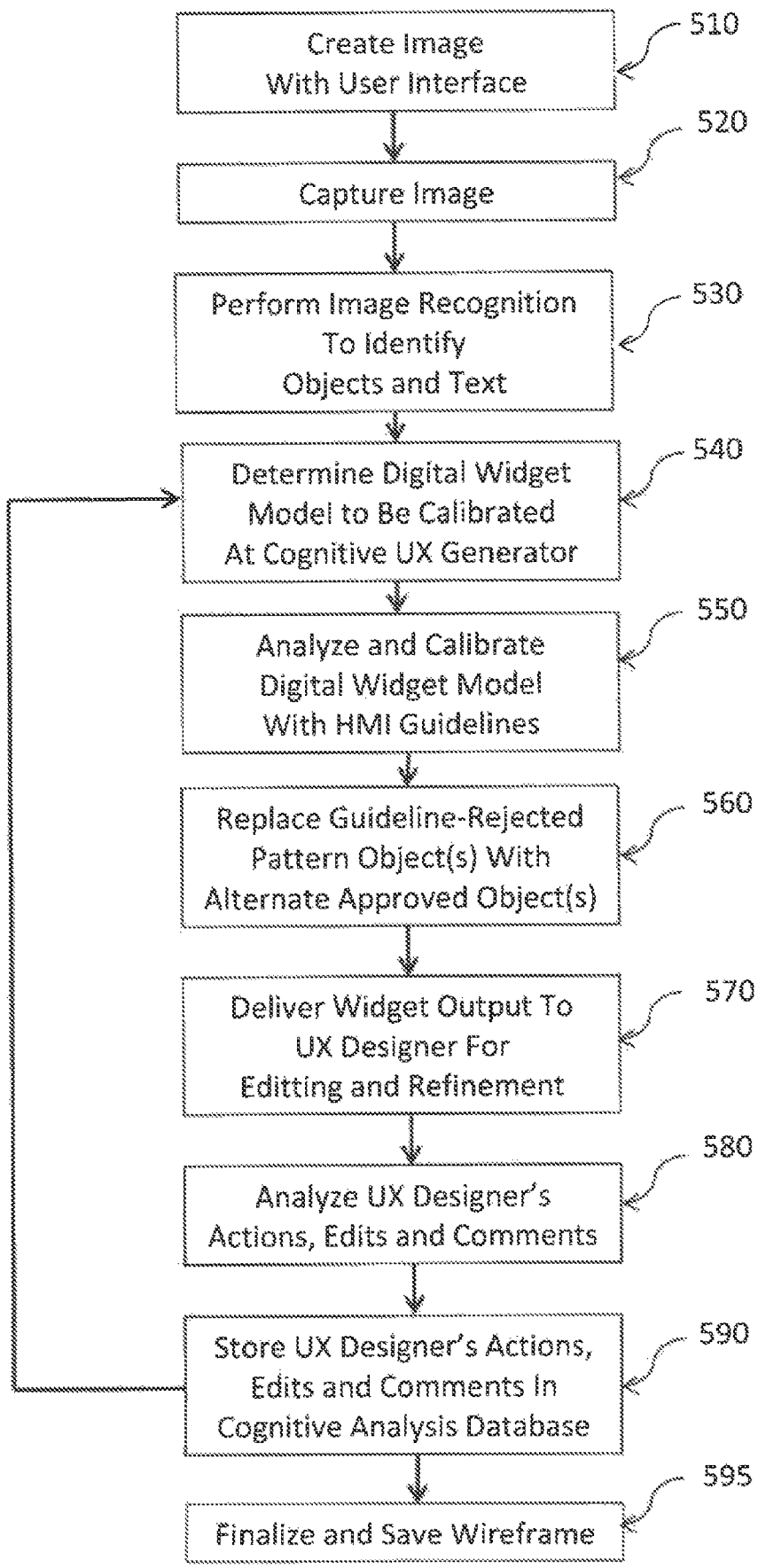
FIG. 5 is a flowchart setting forth steps to convert user interface images to high fidelity personalized wireframes adhering to HMI guidelines according to an embodiment of the present invention.

FIG. 5 is a flowchart setting forth steps to convert user interface images to high fidelity personalized wireframes adhering to HMI guidelines according to an embodiment of the present invention. With reference to FIG. 5, the present invention begins at step 510 with the creation of an image or sketch on a whiteboard or other user interface device for creating an image having objects and text. Specifically, the method of this invention includes identifying widgets from whiteboard sketch, creating an initial whiteboard sketch by maintaining proper pattern for text, UI button, table, view, color etc., and capturing an image at step 520 by taking or downloading a picture of whiteboard work or an image. The image is then uploaded to the appropriate platform, which includes a cognitive UX generator.

The cognitive UX generator 120 performs object pattern recognition at step 530 by using pattern/feature detection algorithm. In one embodiment, systems such as TensorFlow or Caffee Models are utilized for the object recognition. TensorFlow is an open source software library for machine learning across a range of tasks for systems capable of building and training neural networks to detect and decipher patterns and correlations, analogous to the human learning and reasoning. Of course, other object recognition techniques are known to those of skill in the art. Based on the detected objects, the system at step 540 determines the corresponding digital widgets which are to be calibrated using the next steps.

The system next at step 550 analyzes and compares the widget creation and cognitive model with standard HMI guidelines. Specifically, the UX-Developer 460 bootstraps the standard HMI guidelines as basic rules for widget creation cognitive models. Based on the industry and/or Federal HMI guidelines, digital widgets are calibrated to match to the relevant guidelines. This step may be formalized as a multi-label classification problem where the classification engine is trained over time based on the rules (obtained from HMI guidelines or from images adhering to HMI guidelines). Preferably, the system classifies each object in the preceding steps to various widget labels. New labels get added based onto the HMI guidelines. For example, every button could have various alternatives based on guidelines and each alternative would have a label. Any pattern objects that are rejected based on required guidelines are replaced at step 560 with available acceptable pattern objects.

At step 570, the system delivers the widget output to a UX designer who performs a fine-tuning of the widget creation cognitive model by performing UX-reviewer edits. Specifically, the widget output described above is delivered as input to UX-reviewer 460. Behavioral analytics is done on the UX-reviewer edits at step 580 to identify the reviewer's comments and changes on the self-created widgets.

New rules are extracted based on the UX-reviewer chances in the context of the application screen. At step 590, the new rules get added to the widget creation cognitive model as extra features stored in the database 470. These data is used for re-training the model which implicitly adds the new features to the model which is stored in the cognitive analysis database 470. It is noted that the same objective may be achieved using other machine learning (ML) techniques. Machine learning is the subfield of computer science that gives computers the ability to learn without being explicitly programmed. Evolved from the study of pattern recognition and computational learning theory in artificial intelligence, machine learning explores the study and construction of algorithms that can learn from and make predictions on data—such algorithms overcome following strictly static program instructions by making data driven predictions or decisions, through building a model from sample inputs.

Thus, over time, widget creation cognitive model learns many, if not all, of the possible patterns and rules which UX-reviewer 460 will prefer for various widgets and will output wireframe just the way as UX-reviewer might have designed the wireframe. In other words, the cognitive UX generator may convert the whiteboard image 410 directly to a preferred widget arrangement prior to delivering the digital widget arrangement to the UX designer 460 for final refinement.

Finally, the high-fidelity wireframe is finalized and saved by the UX designer 460 at step 595.

The foregoing disclosure proposes a solution to convert an initial whiteboard work for application wireframe drawing to a prototype design file which will be used for developing the application from the scratch. Here, the individual design documents can be pushed to the cloud based storage and, using cognitive analysis, design document can be reusable for further use for upcoming future applications. The present invention also describes how the solution confirms that the wireframe or application design prototype is following certain design guideline or not.

The present invention not only stores screens of whiteboard works in the cloud, the invention creates initial wireframes for application development from white board sketches using image processing. The present invention is not simply storing UI design elements which are generated from initial white board work and rendered into keynote file for application wireframe design.

In conventional systems, there is no cognitive analysis for creating new wireframes or no guideline compliance for individual UI elements.

According to the instant invention, an image analyzer component extracts individual data and stores the data for future references. Using cognitive analysis an application oriented design can be suggested to designer with suitable UI elements collecting from database.

The invention provides UX-personalized Widget creation cognitive model which gets bootstrapped with HMI guidelines, becomes more adaptive (i.e. reduce ambiguities) based on voice conversations during whiteboard discussion and then becomes personalized over time based on UX-reviewer edits which is looped back to the database 470 for the cognitive UX generator 120. Thus, the present system is capable of outputting wireframes from drawings, where the wireframe will ultimately have a high similarity to what the UX-Reviewer 460 would have designed.

One of ordinary skill in the art can appreciate that the various embodiments of the mockup systems and methods described herein can be implemented in connection with any computer or other client or server device, which can be deployed as part of a computer network or in a distributed computing environment, and can be connected to any kind of data store. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the mockup mechanisms as described for various embodiments of the subject disclosure.

Figure 6:
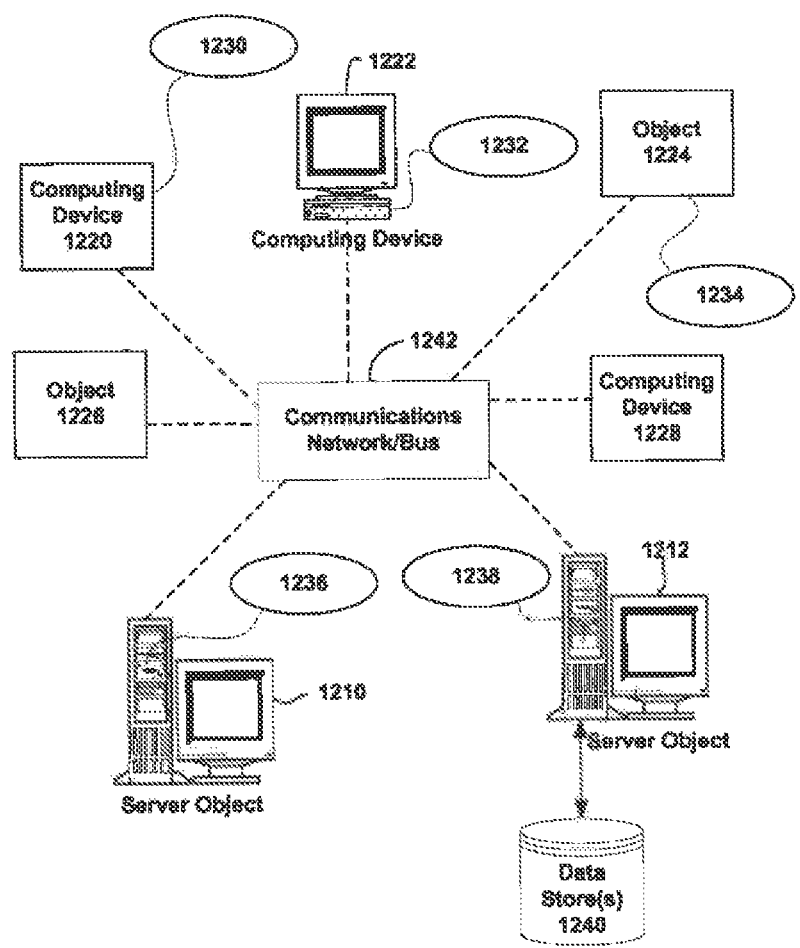
FIG. 6 is a block diagram representing exemplary non-limiting networked environments in which various embodiments described herein can be implemented.

FIG. 6 provides a schematic diagram of an exemplary networked or distributed computing environment. The distributed computing environment comprises computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238 and data store(s) 1240. It can be appreciated that computing objects 1210, 1212, etc. and computing objects or devices 1220, 1222, 1224, 1226, 1228, etc. may comprise different devices, such as personal digital assistants (PDAs), audio/video devices, mobile phones, MP3 players, personal computers, laptops, etc.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1242, either directly or indirectly. Even though illustrated as a single element in FIG. 6, communications network 1242 may comprise other computing objects and computing devices that provide services to the system of FIG. 6, and/or may represent multiple interconnected networks, which are not shown. Each computing object 1210, 1212, etc. or computing object or device 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of the mockup techniques provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the mockup systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 6, as a non-limiting example, computing objects or devices 1220, 1222, 1224, 1226, 1228, etc. can be thought of as clients and computing objects 1210, 1212, etc. can be thought of as servers where computing objects 1210, 1212, etc., acting as servers provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1242 or bus is the Internet, for example, the computing objects 1210, 1212, etc. can be Web servers with which other computing objects or devices 1220, 1222, 1224, 1226, 1228, etc. communicate via any of a number of known protocols, such as the hypertext transfer protocol (HTTP). Computing objects 1210, 1212, etc. acting as servers may also serve as clients, e.g., computing objects or devices 1220, 1222, 1224, 1226, 1228, etc., as may be characteristic of a distributed computing environment.

As mentioned, advantageously, the techniques described herein can be applied to any device where it is desirable to develop user interface mockups in a computing system. It can be understood, therefore, that handheld, portable and other computing devices and computing objects of all kinds are contemplated for use in connection with the various embodiments, i.e., anywhere that resource usage of a device may be desirably optimized. Accordingly, the below general purpose remote computer described below in FIG. 7 is but one example of a computing device.

Although not required, embodiments can partly be implemented via an operating system, for use by a developer of services for a device or object, and/or included within application software that operates to perform one or more functional aspects of the various embodiments described herein. Software may be described in the general context of computer-executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol should be considered limiting.

Figure 7:
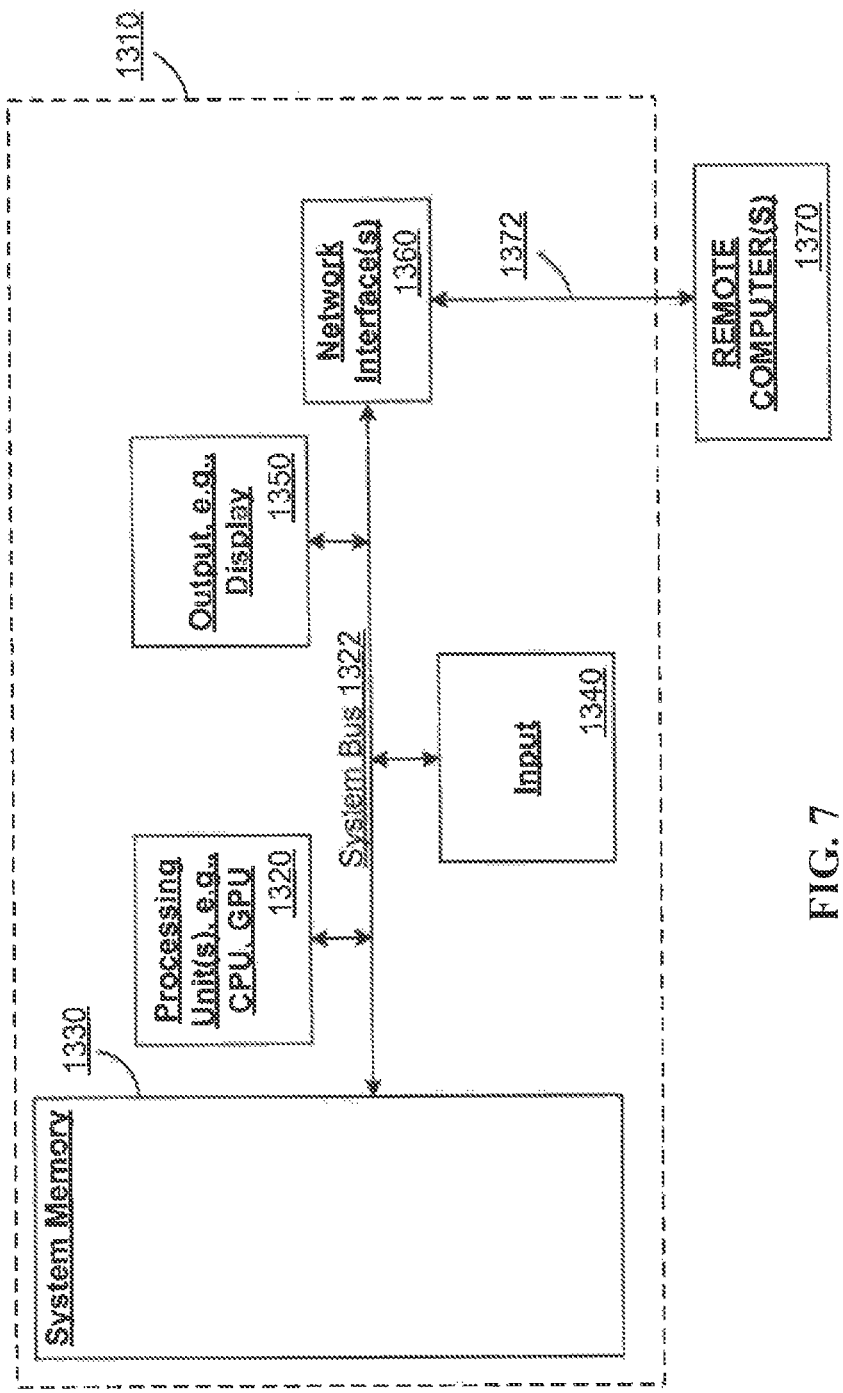
FIG. 7 is a block diagram representing an exemplary non-limiting computing system or operating environment in which one or more aspects of various embodiments described herein can be implemented.

FIG. 7 thus illustrates an example of a suitable computing system environment 1300 in which one or aspects of the embodiments described herein can be implemented, although as made clear above, the computing system environment 1300 is only one example of a suitable computing environment and is not intended to suggest any limitation as to scope of use or functionality. Neither should the computing system environment 1300 be interpreted as having any dependency or requirement relating to any one or combination of components illustrated in the exemplary computing system environment 1300.

With reference to FIG. 7, an exemplary remote device for implementing one or more embodiments includes a general purpose computing device in the form of a computer 1310. Components of computer 1310 may include, but are not limited to, a processing unit 1320, a system memory 1330, and a system bus 1322 that couples various system components including the system memory to the processing unit 1320.

Computer 1310 typically includes a variety of computer readable media and can be any available media that can be accessed by computer 1310. The system memory 1330 may include computer storage media in the form of volatile and/or nonvolatile memory such as read only memory (ROM) and/or random access memory (RAM). By way of example, and not limitation, system memory 1330 may also include an operating system, application programs, other program modules, and program data. According to a further example, computer 1310 can also include a variety of other media (not shown), which can include, without limitation, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information.

A user can enter commands and information into the computer 1310 through input devices 1340. A monitor or other type of display device is also connected to the system bus 1322 via an interface, such as output interface 1350. In addition to a monitor, computers can also include other peripheral output devices such as speakers and a printer, which may be connected through output interface 1350.

The computer 1310 may operate in a networked or distributed environment using logical connections, such as network interfaces 1360, to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 7 include a network 1372, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system.

While it is understood from the foregoing description that this disclosure may be implemented on a cloud computing network, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
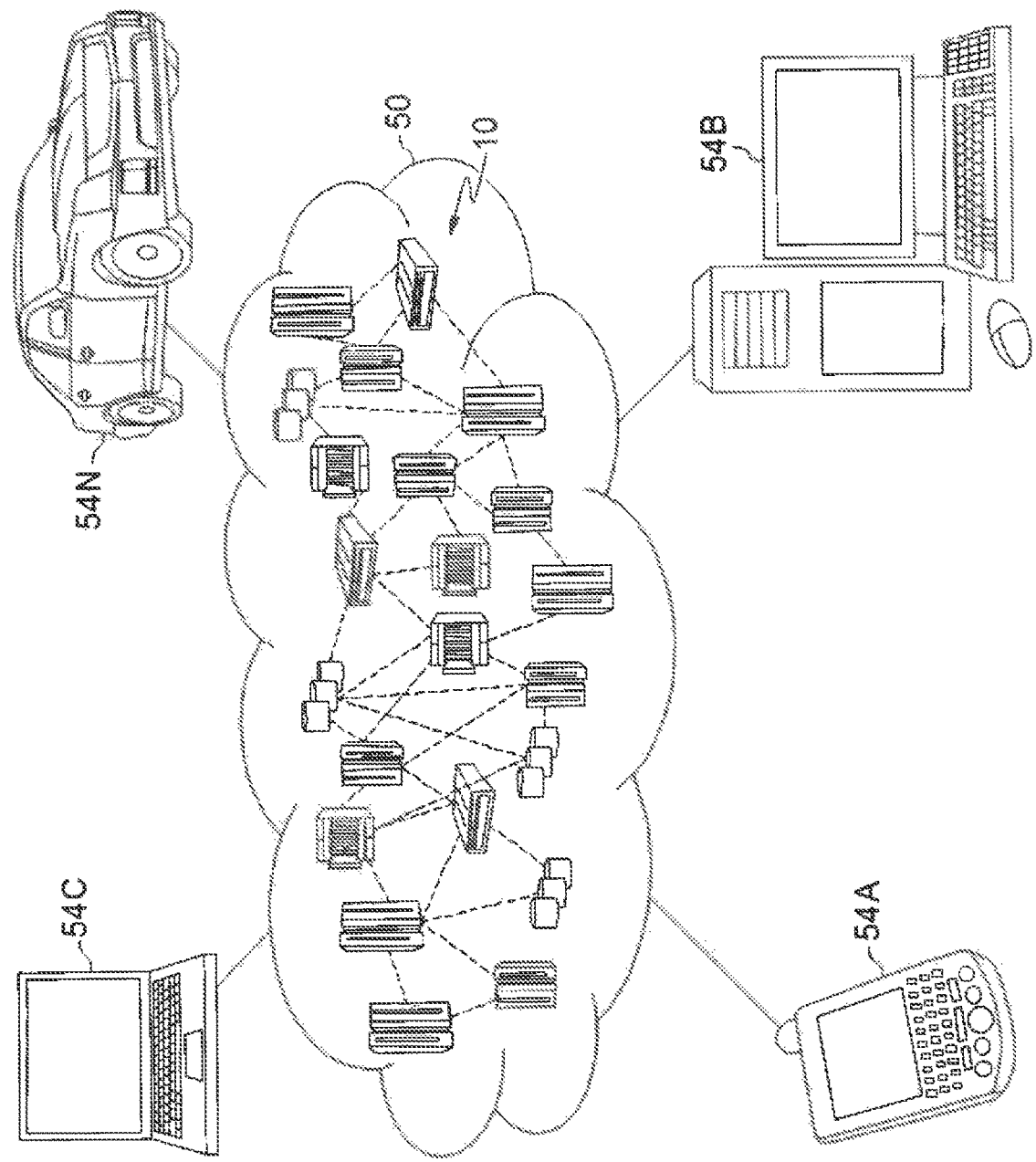
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. Nodes may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
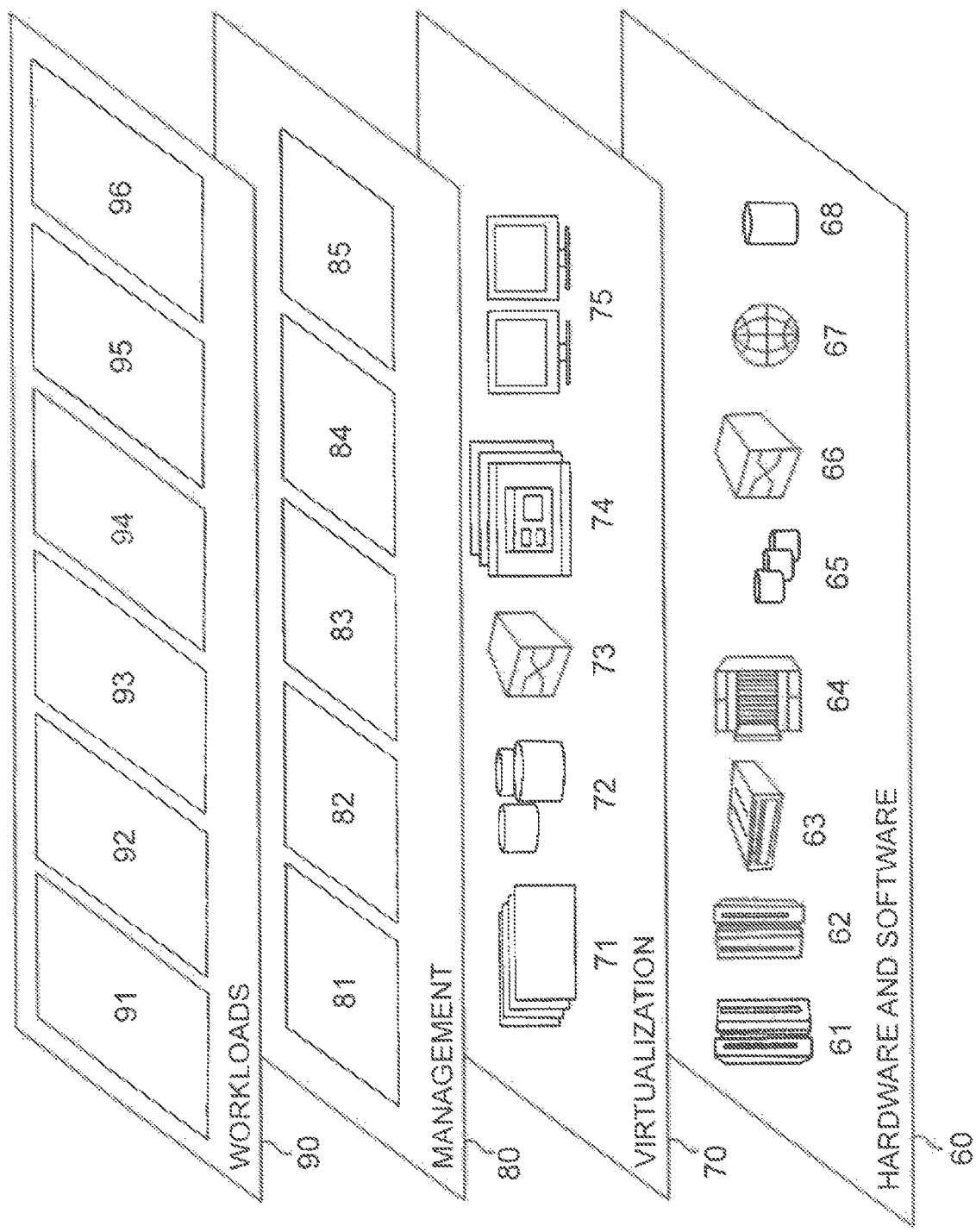
FIG. 9 depicts abstraction model layers according to an embodiment of the present invention.

Referring now to FIG. 9, a set of functional abstraction layers provided by cloud computing environment 50 (FIG. 9) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. metering and pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the method of utilizing the cognitive UX generator 96.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. Those of skill in the art will appreciate that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it will be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention should not be limited to any single embodiment, but rather should be construed in breadth, spirit and scope in accordance with the appended claims.

What is claimed is:

1. A method for creating a wireframe model for a user interface, comprising:
   identifying, by a computer, an image created on a user interface;
   capturing said image from a sketch created on a whiteboard;
   performing, by the computer, image recognition to identify objects and text within said image;
   creating, by the computer, a storyboard based on said step of performing image recognition, wherein said storyboard is converted into a digital widget model;
   calibrating, by the computer, said digital widget model by comparing said digital widget model with a guideline, rejecting at least one feature of the digital widget model based on the guideline, and replacing the rejected feature with an available acceptable feature based on the guideline;
   delivering, by the computer, a digital widget output to a user experience designer for editing, said digital widget output based on said steps of creating and calibrating;
   storing, by the computer, edits made by said user experience designer in an historical record database, wherein said historical record database includes at least one previous edit made by said user experience designer to a previous digital widget output;
   wherein said calibrating said digital widget model further includes comparing, by the computer, said digital widget model to said historical record database, and applying the at least one previous edit to said digital widget model; and
   finalizing a final wireframe model design.

2. The method of claim 1, wherein said guideline is a HMi guideline.

3. The method of claim 1, wherein said guideline is specific to an industry for which said user interface is designed.

4. The method of claim 3, further comprising: replacing said rejected feature with an available acceptable feature stored in said historical record database.

5. The method of claim 1, wherein said identifying an image comprises receiving an image from at least one image of a photo image and a digital image and identifying controls and metadata that is defined for said controls.

6. The method of claim 1, wherein said creating said digital widgets comprises accessing said historical record database to denote at least one digital widget.

7. The method of claim 1, further comprising: analyzing said changes made by said user experience designer for use by a cognitive generator during said step of determining said digital widgets.

8. A computer program product comprising:
   a non-transitory computer-readable storage device; and
   a computer-readable program code stored in the computer-readable storage device, the computer readable program code containing instructions executable by a processor of a computer system to implement a method for creating a wireframe model for a user interface, the method comprising:
   identifying an image created on a user interface;
   capturing said image from a sketch created on a whiteboard;
   performing image recognition to identify objects and text within said image;
   creating a storyboard based on said step of performing image recognition, wherein said storyboard is converted into a digital widget model;
   calibrating said digital widget model by comparing said digital widget model with a guideline, rejecting at least one feature of the digital widget model based on the guideline, and replacing the rejected feature with an available acceptable feature based on the guideline;
   delivering a digital widget output to a user experience designer for editing, said digital widget output based on said steps of creating and calibrating;
   storing edits made by said user experience designer in an historical record database, wherein said historical record database includes at least one previous edit made by said user experience designer to a previous digital widget output;
   wherein said calibrating said digital widget model further includes comparing said digital widget model to said historical record database, and applying the at least one previous edit to said digital widget model; and
   finalizing a final wireframe model design.

9. The computer program product of claim 8, wherein said guideline is a HMI guideline.

10. The computer program product of claim 8, wherein said guideline is specific to an industry for which said user interface is designed.

11. The computer program product of claim 10, said method further comprising: replacing said rejected feature with an available acceptable feature in said historical record database.

12. The computer program product of claim 8, wherein said identifying an image comprises receiving an image from at least one image of a photo image and a digital image and identifying controls and metadata that is defined for said controls.

13. A computer system, comprising:
   a processor;
   a memory coupled to said processor; and
   a computer readable storage device coupled to the processor, the storage device containing instructions executable by the processor via the memory to implement a method for creating a wireframe model for a user interface, the method comprising the steps of:
   identifying an image created on a user interface;
   capturing said image from a sketch created on a whiteboard;
   performing image recognition to identify objects and text within said image;

creating a storyboard based on said step of performing image recognition, wherein said storyboard is converted into a digital widget model;

calibrating said digital widget model by comparing said digital widget model with a guideline, rejecting at least one feature of the digital widget model based on the guideline, and replacing the rejected feature with an available acceptable feature based on the guideline;

delivering a digital widget output to a user experience designer for editing, said digital widget output based on said steps of creating and calibrating;

storing changes made by said user experience designer in an historical record database, wherein said historical record database includes at least one previous change made by said user experience designer to a previous digital widget output;

wherein said calibrating said digital widget model further includes comparing; said digital widget model to said historical record database, and applying the at least one previous change to said digital widget model; and finalizing a final wireframe model design.

14. The computer system of claim 13, wherein said guideline is a HMI guideline.

15. The computer system of claim 13, wherein said guideline is specific to an industry for which said user interface is designed.

16. The computer system of claim 15, said method further comprising: replacing said rejected feature with an available acceptable feature stored in said historical record database.

* * * * *